Patented Sept. 7, 1926.

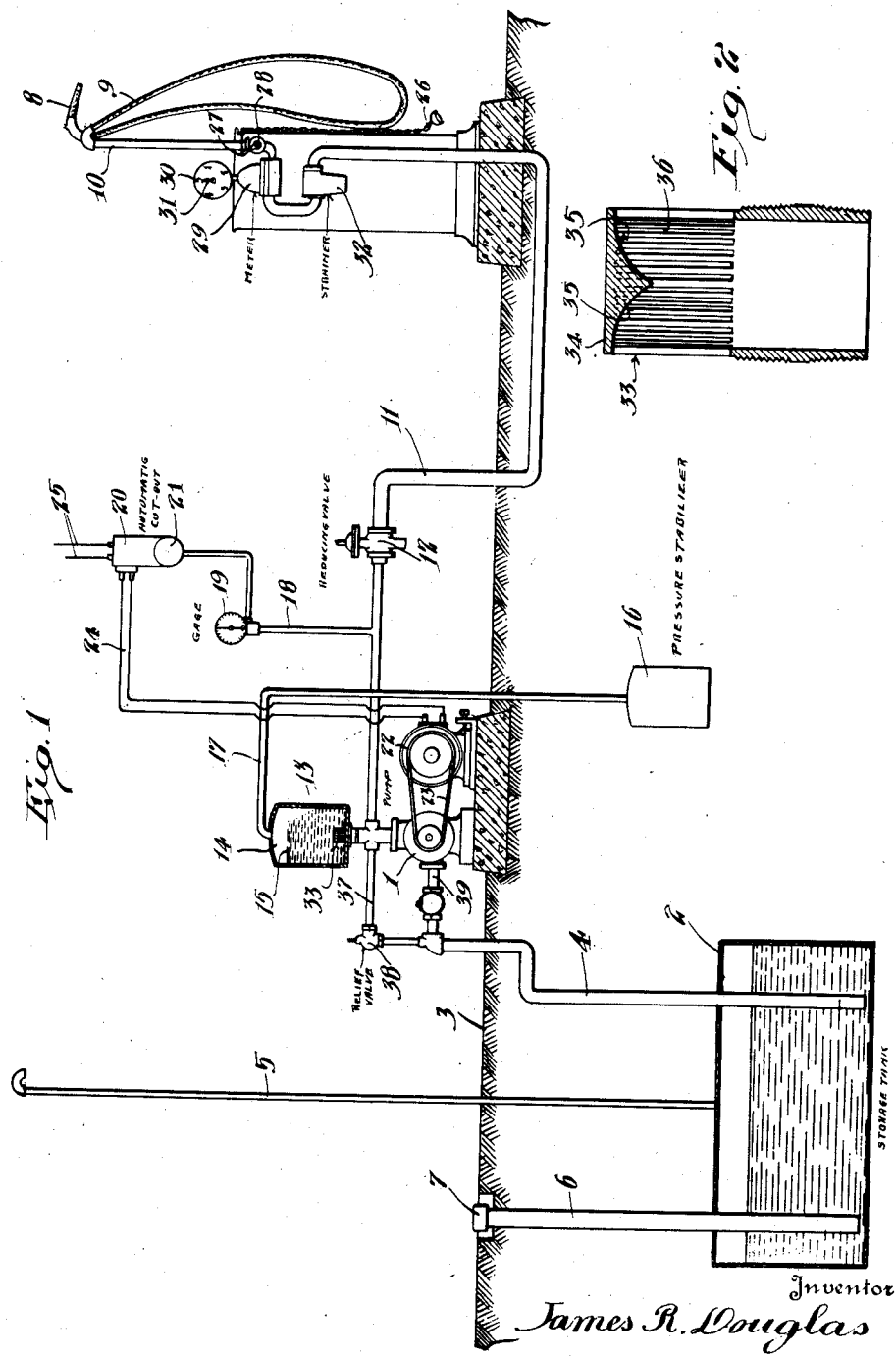

1,599,081

UNITED STATES PATENT OFFICE.

JAMES R. DOUGLAS, OF SAN FRANCISCO, CALIFORNIA, ASSIGNOR TO STANDARD OIL COMPANY, OF SAN FRANCISCO, CALIFORNIA, A CORPORATION OF CALIFORNIA.

APPARATUS FOR DISPENSING LIQUIDS THROUGH METERS.

Application filed March 12, 1925. Serial No. 15,105.

This invention relates to apparatus for dispensing a liquid of any kind and the invention is particularly useful where the quantity of liquid delivered must be measured. While the invention is applicable in various situations it is particularly useful as applied to dispensing or selling of measured quantities of gasoline. It has been the custom to measure gasoline and other liquids by permitting a small reservoir of known volume to be successively filled and emptied, but this method is comparatively slow. It is possible to measure the quantity of liquid delivered by means of a flow-meter but when the meter is used it is necessary to insure a substantially constant velocity flow through the meter in order that the indications by the meter will be substantially correct. The general object of this invention is to provide apparatus for delivering liquid at a substantially constant velocity so that it can be accurately measured by a meter, without however necessitating the presence of a large quantity of the liquid under pressure; that is to say the practice of the invention enables simple apparatus to be employed and automatically controlled to maintain a substantially constant velocity of flow when the apparatus is in use.

In the embodiment of the invention illustrated I employ a surge-tank, and one of the objects of the invention is to provide means to prevent air or gas entering the pipe line at the surge-tank.

The invention consists in the novel parts and combination of parts to be described hereinafter, all of which contribute to produce an efficient apparatus for dispensing liquids through meters.

A preferred embodiment of the invention is described in the following specification, while the broad scope of the invention is pointed out in the appended claims.

In the drawing:—

Fig. 1 is a diagram illustrating apparatus embodying my invention, and

Fig. 2 is a vertical section upon a larger scale through the admission cap of the surge-tank, which constitutes a feature of my invention.

My apparatus includes means such as a pump 1 for developing pressure in the liquid. In the present instance this pump draws liquid such as gasoline from a reservoir 2 buried below the ground lever 3. The pump draws the gasoline up through an intake pipe 4. The reservoir or storage tank 2 is vented to the air by suitable vent pipe 5 and supplied with a suitable filling pipe 6 with a removable cap 7. The pump delivers the liquid or gasoline to a delivery nozzle 8 which in the present instance is connected by flexible hose 9 to a short stand pipe 10. Between the nozzle 8 and the pump a duct is provided for the liquid. In the present instance this is in the form of an ordinary pipe line 11 through which the liquid is impelled by the pump.

In the pipe line between the pump and the nozzle I provide a reducing valve 12 of any suitable construction which functions to deliver the liquid through the pipe line flowing in the directions of the nozzle, at a substantially uniform velocity.

It is a fact, however, that this velocity necessarily varies somewhat if the pressure on the receiving side of the reduction valve varies greatly. For this reason I provide stabilizing means in the pipe line between the pump and the reducing valve and I also provide automatic means for controlling the operation of the pump through the agency of the pressure existing in the pipe line between the pump and the reducing valve. For this purpose I provide a surge tank 13 which is connected with the pipe line preferably directly over the pump, and this surge tank is closed so that its upper end is a pressure chamber 14 in which air or the vapors of the liquid would be compressed whenever the level 15 of the liquid rises in the surge tank. The capacity of this air chamber 14 is preferably increased by the addition of a pressure tank 16 which in the present instance is buried below the ground level and connected by a pipe 17 with the chamber 14 above the level of the liquid. By positioning the pressure stabilizer or tank 16 underground it is possible to comply with ordinances limiting the capacity of above ground containers for gasoline and to reduce or eliminate fluctuations induced by temperature variations in the volume of the air and vapor present in said tank 16.

Between the pump and the reducing valve a pipe connection 18 is provided carrying a gage 19 for indicating the pressure in this part of the pipe line and beyond the gage 19 a pipe connection connects with an automatic cut-out or switch 20 which is controlled by a pressure gage 21. The function of this cut-out is to control the operation of an electric motor 22 which drives the pump. In the present instance the pump is driven through a belt 23. In the operation of the apparatus if the pressure in the line between the pump and the reducing valve reaches a minimum limit the pressure gage 21 will close a circuit 24 through the motor, said circuit being supplied with electric current through conductors 25 from a service line.

In the operation of this apparatus the pump will of course operate intermittently to maintain the substantially constant pressure on the receiving side of the reducing valve. The nozzle 8 may be hooked on the side of the stand pipe 10 and when gasoline is to be delivered it is taken down and thrust into the gasoline tank. The man holding the nozzle then pulls a chain 26 which is attached to the lever 27 of a valve 28. In the line 11 near the nozzle 8 a flow-meter 29 is provided. When filling a gasoline tank with the nozzle the operator of the apparatus watches the gage 30 of the meter and permits the valve 28 to close as soon as the required amount of gasoline has flowed through the nozzle. As the pointer 31 arrives at each gasoline indication on the scale of the indicator 30 a bell within the indicator rings automatically so as to warn the operator when the valve 28 should be closed to deliver any given measured quantity of gasoline.

In the pipe line between the reducing valve and the meter I provide a strainer 32 of any suitable construction.

The stand pipe 10 operates to prevent variations in the siphoning effect of the hose when in use and operates to give a constant head against which the liquid is being delivered by the reducing valve. This tends to increase the accuracy of the reading of the indicator of the meter.

There is a tendency for the agitation that occurs in the surge-tank to carry air or gas from this tank into the pipe line. In order to prevent this I provide the connection to the surge-tank with an inlet cap 33 (see Fig. 2). This cap is of tubular form, closed above by a head 34 with a substantially conical abutment on its under side. When the liquid surges up into this tank the concave faces 35 of this abutment deflect it in a horizontal and radial direction through vertical slots 36 formed in the cylindrical side wall of the cap. This reduces agitation of the surface of the liquid to a minimum.

In the operation of the device the automatic cut-out 20, of course, opens the circuit 24 at the maximum pressure limit and stops the pump, and if the cut-out should fail to operate for any reason the pressure developed by the pump will be relieved through a by-pass connection 37 and a relief-valve 38 which operate to by-pass the liquid around to the inlet 39 of the pump.

It is understood that the embodiment of the invention described herein is only one of the many embodiments this invention may take, and I do not wish to be limited in the practice of the invention, nor in the claims, to the particular embodiment set forth.

What I claim is:—

1. In apparatus for dispensing liquid, the combination of a pump for raising the pressure of the liquid, a motor for the pump, a delivery nozzle, a pipe line connecting the pump with the delivery nozzle, a closed surge tank connected with the pipe line, a pressure chamber connected with the same above the level of the liquid therein, a reducing valve in the line between the surge tank and the nozzle, a meter between the reducing valve and the nozzle, and automatic means controlled by the pressure in the apparatus for controlling the operation of the motor.

2. In apparatus for dispensing liquid, the combination of a pump for developing pressure in the liquid, a delivery nozzle, a pipe line between the pump and the delivery nozzle, a closed surge-tank connected with the pipe line, a pressure tank at a lower level than the surge tank and connected to the upper part of the surge tank, a reducing valve in the pipe line between the surge tank and the nozzle, and a meter between the reducing valve and the nozzle.

3. In apparatus for dispensing gasoline, the combination of a pump for developing pressure in the gasoline, a delivery nozzle, a pipe line between the pump and the delivery nozzle, a closed surge-tank connected with the line for stabilizing the pressure, a pressure tank disposed below the ground level and connected with the upper part of the surge tank, a reducing-valve in the line between the surge tank and the nozzle, a meter between the reducing valve and the nozzle, a motor for driving the pump, and automatic means for starting up the motor when the pressure in the line reaches a minimum limit.

4. In apparatus for dispensing liquid, the combination of a pump for raising the pressure of the liquid, a delivery nozzle, a pipe line connecting the pump with the delivery nozzle, a closed surge tank connected with the pipe line, a pressure chamber communicating with the upper part of the surge tank, a motor for driving the pump, automatic means for opening the motor circuit at a maximum pressure limit and a by-pass connection with a relief valve from the delivery side of the pump to the inlet side to relieve the pressure developed by the pump in case the automatic means for opening the circuit fails to operate.

5. In apparatus for dispensing liquid, the combination of an underground storage tank, a surface pump for delivering fluid from said tank under pressure, an elevated delivery nozzle, a pipe line connecting said delivery nozzle with said pump, a closed surge-tank connected with said pipe line, an underground pressure tank, a reducing valve in the pipe line between the surge tank and the delivery nozzle, and a meter between the reducing valve and the nozzle.

Signed at San Francisco, California, this 3rd day of March, 1925.

JAMES R. DOUGLAS.